Sept. 8, 1925.
J. L. SHULTZ
1,552,886
BRAKE OPERATING MECHANISM
Filed June 22, 1925
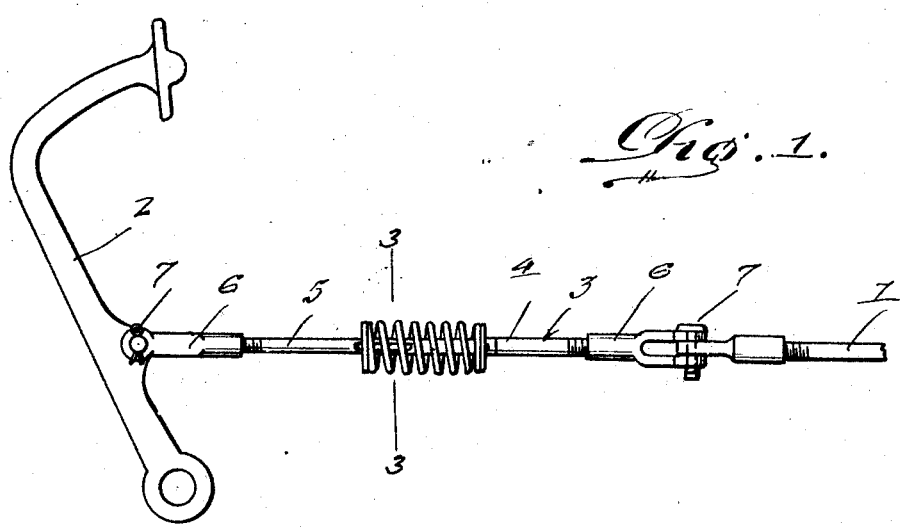
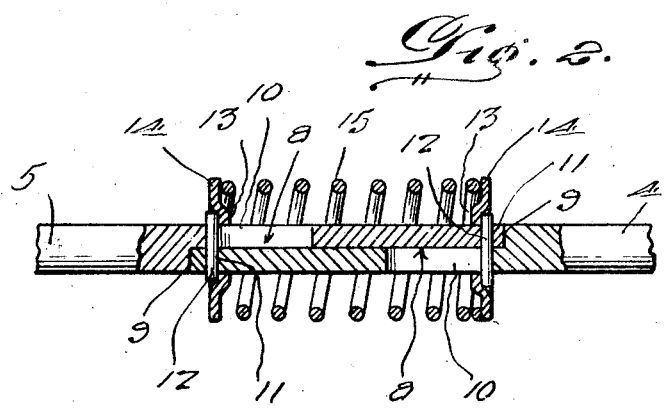
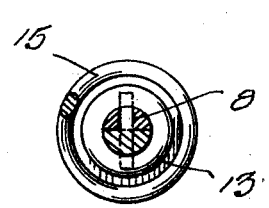
Inventor
J. L. Shultz,
By Clarence A. O'Brien
Attorney Patented Sept. 8, 1925.

1,552,886

UNITED STATES PATENT OFFICE.

JOHN L. SHULTZ, OF BELLEFONTE, PENNSYLVANIA, ASSIGNOR OF ONE-THIRD TO WILLIAM A. KLINE, OF BELLEFONTE, PENNSYLVANIA.

BRAKE-OPERATING MECHANISM.

Application filed June 22, 1925. Serial No. 38,749.

*To all whom it may concern:*

Be it known that I, JOHN L. SHULTZ, a citizen of the United States, residing at Bellefonte, in the county of Center and State of Pennsylvania, have invented certain new and useful Improvements in Brake-Operating Mechanisms, of which the following is a specification.

This invention relates to brake operating mechanisms and particularly to a connecting rod between the operating member for the brake and the mechanism applying the brake adapted to compensate for wear in the brake lining and other parts.

An object of the invention is to provide a connecting rod composed of sections having opposite diametrically arranged portions having adjacent ends of the sections removed so that the remaining portions of the sections may be positioned in overlapping relation and formed with slots to removably receive pins, the ends of which are adapted to extend transversely beyond the periphery of the rod and be received within the offset portion of suitable plate members which are retained in engagement with the pin by a suitable coil spring retained under compression between the plate members.

The invention includes other objects residing in the details of construction and arrangement of parts to provide a construction which is simple and inexpensive to manufacture, and which is more particularly pointed out in the following detailed description and in the claim directed to the preferred form of the invention, it being understood that various changes in the specific details of construction and arrangement of parts may be made, without departing from the spirit and scope of the invention as herein set forth.

In the drawings, forming a part of this application:

Figure 1 is a side elevation of a portion of the brake mechanism showing the improved connection rod structure interposed between the brake rod and the foot pedal.

Figure 2 is an enlarged longitudinal sectional view, taken through the overlapped end of the rod section illustrating the improved structure of the invention.

Figure 3 is a sectional view, taken on the line 3—3 of Figure 1.

1 indicates the usual brake operating rod connected with the brake mechanism of a vehicle or the like, the operation of which is adapted to operate the brake pedal of any suitable type, in a well known manner. This rod is usually connected with the foot pedal 2 and in the case of the present invention has the improvement comprising the invention interposed between the foot pedal 2 and the rod 1, as clearly illustrated in Figure 1, by the numeral 3.

The device forming the subject matter of the present invention is illustrated by the numeral 3 and includes the rod member formed of sections 4 and 5 respectively, which are threaded at the free ends to receive bifurcated heads 6 adjustably connected therewith for pivotal attachment at 7, with the brake operating rod 1 and the foot pedal 2, in the manner as clearly illustrated in Figure 1 of the drawing. The adjacent ends of the rod sections 4 and 5 have the end portions removed at one side along the diametrical plane of the rod as indicated at 8, while the ends of the removed portions of the juncture with the portion of the rod sections and circular sections form shoulders 9, which are adapted to provide stops to limit the overlapping movement of one rod section relative to the other. The portions of the rods of reduced section adjacent the shoulder portions 9 are formed with longitudinally extending slots 10, while the end portions of the opposite section overlapping the slotted portions are formed with openings 11, for removably receiving the transversely extending pins 12. The ends of the pins 12 project beyond the periphery of the rod sections 4 and 5 respectively and into the recessed portion of the plate member 13 formed by the offset flanges 14, so that the offset flanges form a means of retaining the pins 12 in proper position in the openings 11, and the slots 10 at the respective ends of the rod sections 4 and 5. Between the plate members 13 is positioned a coil spring 15, normally held under compression to receive the plate members in engagement with the pin 12 and the rod sections in full overlapped relation with the end portions abutting the shoulders 9. The offset position of the flanges 14 and the plate members 13 serve to center the coil spring 15 so that it is held in concentric relation with respect to the rod section.

It will be seen that in the application of the invention between the brake pedal and operating rod as illustrated in Figure 1, it is such that when the device is adjusted by the positioning of the bifurcated head 6 in the proper manner on the rod sections 4, 5, and 6 respectively that upon the operation of the brake pedal, the spring 15 will be placed under greater compression and through which the desired tension can be applied to the brake and maintained thereon. The spring will furthermore compensate for unevenness in the operation of the brake and for wear and changes in the positioning of the parts during the application of the brake during the time that the foot pedal is held in a depressed position. In this way, a substantially simple structure possessing numerous advantages is provided at a relatively smaller constructional cost, which is efficient in operation.

What is claimed is:

In a brake operating mechanism, a connecting rod composed of sections, which are circular in transverse section, said sections being diametrically flattened at their ends and provided with shoulders at the ends of the flattened portions, said diametrically flattened end portions overlapping each other, the shoulders forming stops to limit the overlapping movement, said flattened portion being formed with longitudinally extending slots adjacent the shoulder portion and openings adjacent the ends adapted to register with the slots in the opposite section, annular plates having central openings formed therein for receiving the rod sections, said plates having annular offset flanges on the periphery thereof, pins mounted in the openings and slots of the rod sections received by the plates and retained in connection with the rod section by the offset portions of the plates, and a coil spring interposed between said plates and normally under compression for holding the rod sections with the ends engaging the shoulders.

In testimony whereof I affix my signature.

JOHN L. SHULTZ.